United States Patent [19]

Wracsaricht

[11] 4,306,157
[45] Dec. 15, 1981

[54] UNDERWATER SLOW CURRENT TURBO GENERATOR

[76] Inventor: Lazar J. Wracsaricht, 2601 Capitol Way, Olympia, Wash. 98501

[21] Appl. No.: 50,440

[22] Filed: Jun. 20, 1979

[51] Int. Cl.³ .............................................. F01D 15/10
[52] U.S. Cl. ........................................ 290/54; 290/43
[58] Field of Search ................ 290/43, 54; 416/84–86, 416/174, 198–201, DIG. 4; 417/334, 337

[56] References Cited

U.S. PATENT DOCUMENTS

| | | | |
|---|---|---|---|
| 868,798 | 10/1907 | McLaughlin | 416/DIG. 4 |
| 966,654 | 8/1910 | Coma | 416/201 |
| 2,501,696 | 3/1950 | Souczek | 290/43 |
| 3,867,062 | 2/1975 | Troller | 416/198 X |
| 3,974,396 | 8/1976 | Schonball | 290/54 |
| 3,980,894 | 9/1976 | Vary et al. | 290/54 |
| 4,095,918 | 6/1978 | Mouton, Jr. et al. | 290/54 X |

FOREIGN PATENT DOCUMENTS 52-29547  5/1977  Japan ..................................... 290/54

Primary Examiner—J. V. Truhe
Assistant Examiner—W. E. Duncanson, Jr.
Attorney, Agent, or Firm—Cole, Jensen & Puntigam

[57] ABSTRACT

A self-contained electrical generating device for placement in a naturally flowing stream. The generating device converts the kinetic energy generated by fluid flow or gravity contained within the flowing stream whether river or ocean current into useful electric energy using blade configuration and placement to maximize the usable energy. The present invention also using auxiliary means to increase the rate of flow of the fluid by the blades of the generator thus increasing the energy capable of conversion. The rotor and the stator are located radially outwardly from the rotating hub of the generating system and are supported by spoke like legs thus greatly reducing any resistance to water flow, minimizing the disturbance to the flowing stream and maximizing the relative linear velocity between the rotor and the stator.

1 Claim, 15 Drawing Figures

U.S. Patent   Dec. 15, 1981   Sheet 3 of 5   4,306,157
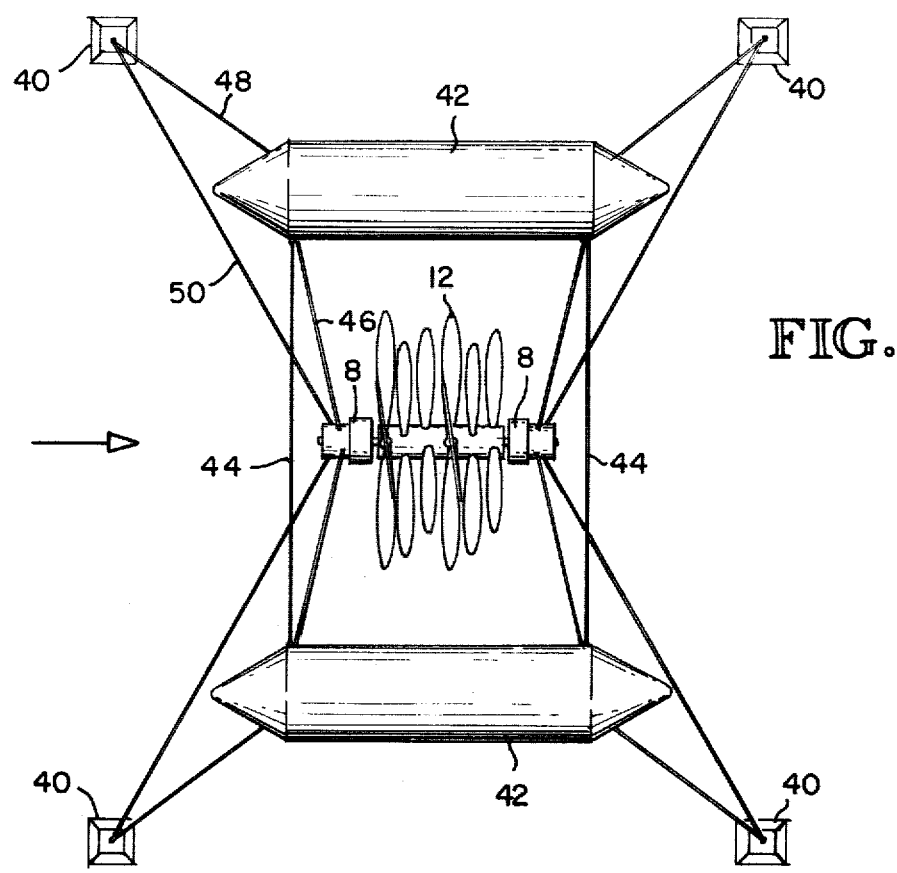
FIG. 5
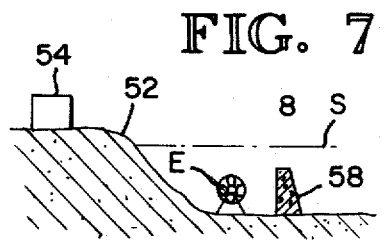
FIG. 7
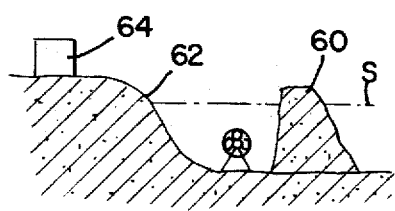
FIG. 9
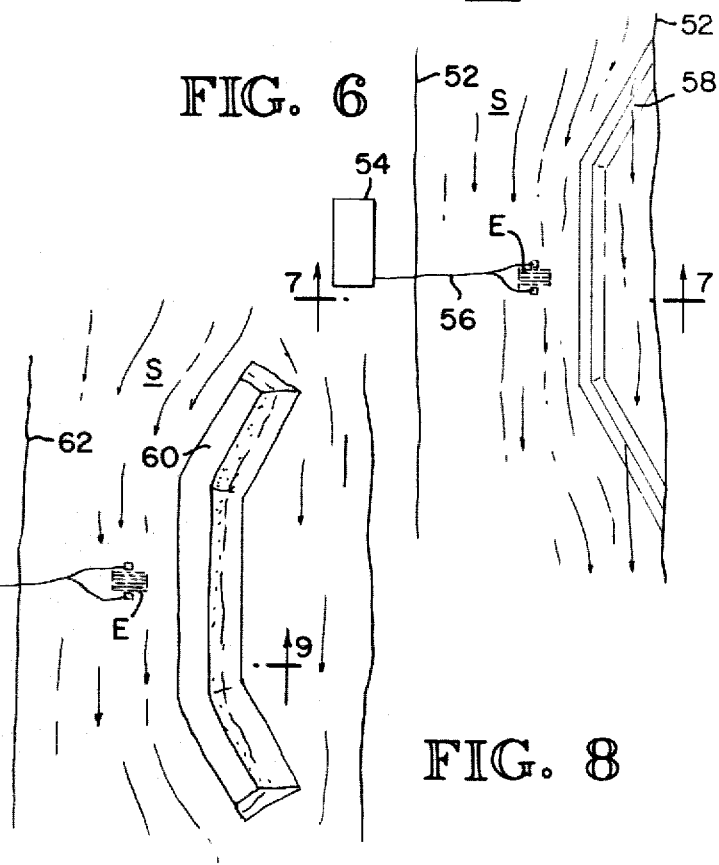
FIG. 6
FIG. 8

4,306,157

UNDERWATER SLOW CURRENT TURBO GENERATOR

BACKGROUND OF THE INVENTION

It is well known and recognized that the citizens of the world and particularly the United States have been continuously wasteful of our natural resources and therefore, we are currently at a point in time where we must locate sources of energy which neither deplete our natural resources more than absolutely necessary nor cause an excessive amount of pollution.

Although it has been acceptable in the past to utilize the flowing streams by building dams and thus using the stored water as a hydroelectric source, this practice has come under increased criticism because of the disruption of natural life cycle of fishes or the like and further because it inundates and thus renders useless a substantial amount of land. Attempts have been made to utilize nuclear reactors to generate electricity but this has come under extreme criticism because of the danger of an accident and the resultant nuclear pollution. Attempts have been made, and continue to be made, to utilize the energy of the sun to create electricity, however, this is somewhat limited by our technology and further limited by the geographical location of the solar collectors since to be effective, they must have a substantial number of hours during the day wherein the collector is subjected to the direct light of the sun.

With the above noted facts in mind, it is one of the purposes of the present invention to provide energy at a largely reduced cost in terms of the expenditure of natural resources or the disruption of the environment. It is proposed that this be done by capitalizing upon the natural flow of water which occurs in many places throughout the world.

Other structures utilizing water flow to generate electrical energy are disclosed in the following:

- U.S. Pat. No. 2,436,683 granted to Wood on Feb. 24, 1948 which discloses a generator mounted within the spur of a pipeline wherein the flow of liquid within the pipe generates electricity which is used to charge the pipe material to minimize the effect of electrolysis.
- U.S. Pat. No. 2,634,375 granted to Guimbal on Apr. 7, 1953 which discloses a combined turbine and generator unit for mounting within the throat of a convergent/divergent conduit including means for preventing leakage to the interior of the unit and providing improved cooling and lubricating of the unit.
- U.S. Pat. No. 2,782,321 granted to Fischer on Feb. 19, 1957 which discloses a turbine for driving a generator which is of the underwater power plant turbine type. The generator is encased in a part of the water supply pipe so that it may be swiveled about an axis of rotation into the opposite inflow direction and thus be utilized as a pump.
- U.S. Pat. No. 3,231,768 granted to Dannenmann on Jan. 25, 1966 which discloses an electrical motor for use submerged in a liquid wherein the stator is moisture sealed by forming the casing and sealing tube of a single material.
- U.S. Pat. No. 3,353,028 granted to Braikevitch et al on Nov. 14, 1967 wherein the connection between the runner of the water turbine and the electrical generator located about the runner are interconnected without resorting to shafting.
- U.S. Pat. No. 4,069,424 granted to Burkett on Jan. 17, 1978 which discloses a multiple unit installation of a motorized generator wherein the starting system is used to gradually adjust the rotational speed of a selected turbine generator set to a point where phase and frequency may be matched with that of the parking bus.
- U.S. Pat. No. 4,069,673 granted to Lapeyre on Jan. 24, 1978 discloses a sealed turbine engine which becomes operative at low speeds of working fluid and includes a fixed stator with a rotor coaxially disposed about the stator for rotation relative thereto.
- U.S. Pat. No. 4,083,186 granted to Jackson on Apr. 11, 1978 which discloses an apparatus and method for converting hydrostatic energy to electrical energy wherein the equipment is essentially automatic in operation.
- U.S. Pat. No. 4,092,827 granted to Schneider on June 6, 1978 which discloses an apparatus for conservation of rainwater and including a means whereby the rainwater itself generates electricity to drive the necessary pump equipment.
- U.S. Pat. No. 4,117,353 granted to Hoffeins on Sept. 26, 1978 which discloses a turbine machine having optional modes of operation.
- U.S. Pat. No. 4,117,676 granted to Atencio Oct. 3, 1978 which discloses a submersible hydroelectric machine which will generate electricity with low head and a machine which is particularly designed for use in dams for navigational systems, inoperative locks, abandoned dikes and the like.
- U.S. Pat. No. 4,118,636 granted to Christian Oct. 3, 1978 which deals with an electrical generating system wherein the turbine is driven by thermal air.
- U.S. Pat. No. 4,122,381 granted to Sturm on Oct. 24, 1978 dealing with a home power station and in particular the distribution panel and means for giving status information with respect to the stored electricity.
- U.S. Pat. No. 4,123,666 granted to Miller on Oct. 31, 1978 which discloses a tube-type hydraulic generator having a bladed wheel which rotates about a horizontal axis and is provided with fixed blades which are encircled by and connected with a rim to which the rotor of the surrounding electrical machine is attached.
- U.S. Pat. No. 4,129,786 granted to Miller on Dec. 12, 1978 which deals with a hydroelectric machine which is in the form of a rim which surrounds a service water duct containing the bladed wheel.

An article in the May 1979 issue of Omni written by Scott Morris entitled "Gulf Dream" dealing with utilizng the gulf stream as a source for generating electricity.

Energy Technology Handbook edited by Douglas M. Considine published in 1977 by McGraw Hill in particular, pages 810-845.

Other references considered during the preparation of the application include the following:

- U.S. Pat. No. 4,068,476 granted to Kelsey on Jan. 17, 1978
- U.S. Pat. No. 4,069,669 granted to Pitkanen on Jan. 24, 1978
- U.S. Pat. No. 4,073,969 granted to Basmajiam on Feb. 14, 1978

U.S. Pat. No. 4,074,526 granted to West on Feb. 21, 1978

U.S. Pat. No. 4,074,527 granted to Sadler on Feb. 21, 1978

U.S. Pat. No. 4,075,838 granted to Pelin on Feb. 28, 1978

U.S. Pat. No. 4,077,748 granted to Potz on Mar. 7, 1978

U.S. Pat. No. 4,079,623 granted to Inoue on Mar. 14, 1978

U.S. Pat. No. 4,085,544 granted to Blake on Apr. 25, 1978

U.S. Pat. No. 4,086,764 granted to Brown et al on May 2, 1978

U.S. Pat. No. 4,086,765 granted to Gillilan on May 2, 1978

U.S. Pat. No. 4,093,869 granted to Hoffmann et al on June 6, 1978

U.S. Pat. No. 4,095,118 granted to Rathbun on June 13, 1978

U.S. Pat. No. 4,104,535 granted to Bronicki on Aug. 1, 1978

U.S. Pat. No. 4,109,160 granted to Goto et al on Aug. 22, 1978

U.S. Pat. No. 4,110,980 granted to Foulke on Sept. 5, 1978

U.S. Pat. No. 4,111,101 granted to Obiya et al on Sept. 5, 1978

U.S. Pat. No. 4,117,344 granted to Boerstler et al on Sept. 26, 1978

U.S. Pat. No. 4,117,696 granted to Fawcett et al on Oct. 3, 1978

U.S. Pat. No. 4,122,356 granted to Decker on Oct. 24, 1978

U.S. Pat. No. 4,124,805 granted to Jakoby on Nov. 7, 1978

U.S. Pat. No. 4,125,780 granted to Greenet on Nov. 14, 1978

With the above noted prior art and references in mind, it is a primary object of the present invention to provide a means for generating electrical energy using the kinetic energy, gravitational force and velocity of a flowing stream.

It is another object of the present invention to provide an electrical generating device mounted within the stream that disturbs the flow in the stream as little as possible while capitalizing upon as much of the kinetic energy as possible.

Still a further object of the present invention is to provide means for generating electrical energy wherein the means is mounted totally beneath the surface of the water thus creating no disturbance and having minimal effect upon navigation.

Yet a further object of the present invention is to provide a generator which is suspended within a stream of flowing water to extract kinetic energy of the flowing stream and convert it to electrical energy.

Yet another object of the present invention is to have a generator which is located some distance from the means for accepting the electric energy in that the impulses from the coil are transferred by conduit to a distant position.

Yet another object of the present invention is to provide a means whereby several generators may be electronically linked together such that the output is the average power of all of the generators.

A further object of the present invention is to provide a switching mechanism which responds to a change in frequency and interconnects to appropriate poles of the generator to assure stable frequency and voltage.

Yet another object of the present invention is to provide a water powered turbine generator which, to reduce the impact upon the water flowing thereby, is designed such that the maximum amount of water not utilized in causing turbine rotation passes through the generator including between the rotor and the stator.

Another object of the present invention is to provide an underwater electrical power generating mechanism which because of its low speed of rotation, the provision of an "as needed" lubrication system and its simple construction needs very little maintenance and is extremely long lived.

Still a further object of the present invention is to provide means whereby electric energy may be created at a minimal cost and environmental disturbance.

BREIF DESCRIPTION OF THE DRAWINGS

FIG. 5 is a top plan view of the generator of FIG. 4.

FIG. 6 is a schematic representation of one means of diverting current flow to increase the speed at which current passes by the inventive generator.

FIG. 7 is an elevational view taken along lines 7—7 of FIG. 6.

FIG. 8 is a schematic view of yet another method of diverting current flow.

FIG. 9 is an elevational view taken along lines 9—9 of FIG. 8.

FIG. 13 is a cross-sectional view of one form of interconnecting cable which would permit the control of frequency or the like.

DETAILED DESCRIPTION OF THE DRAWINGS

Figure 1:
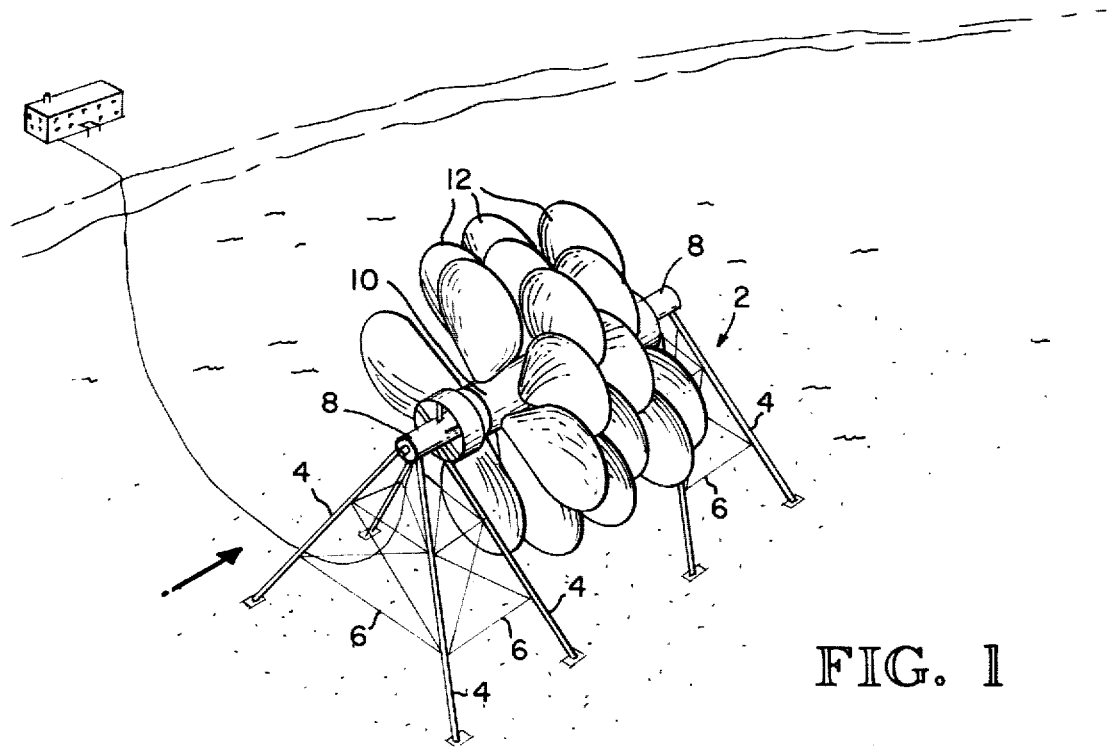
FIG. 1 is an environmental view showing the placement of one embodiment of the inventive generator within an ocean current with the generated electricity being transferred to a shore side establishment for modulation if necessary.

As seen in FIG. 1, the inventive generator which capitalizes upon the kinetic energy of a flowing stream be it a river or an oceanic stream in one embodiment includes a support framework means generally designated as 2 having a plurality of legs 4 interconnected by struts or cables 6. This structure provides the necessary rigid support and yet creates little interference with the stream flow. Mounted to the upper portion of the stand 2 is a generator device itself having the axis oriented such that it lies in the direction of prevailing stream flow. As seen in this figure, the device includes a generator 8 mounted upon each end of the device interconnected by means of an axial rod or shaft 10 having a plurality of radially outwardly extending blades 12 mounted thereon for interaction with the passing flow. The flow of the stream by the blades 12 cause the axis or shaft 10 to rotate and as explained hereinafter, the shaft or axis is directly connected to the rotor of the generator or generators thus creating electrical energy. It is to be understood that the inventive device may include one or more generators depending upon need and current flow.

Figure 2:
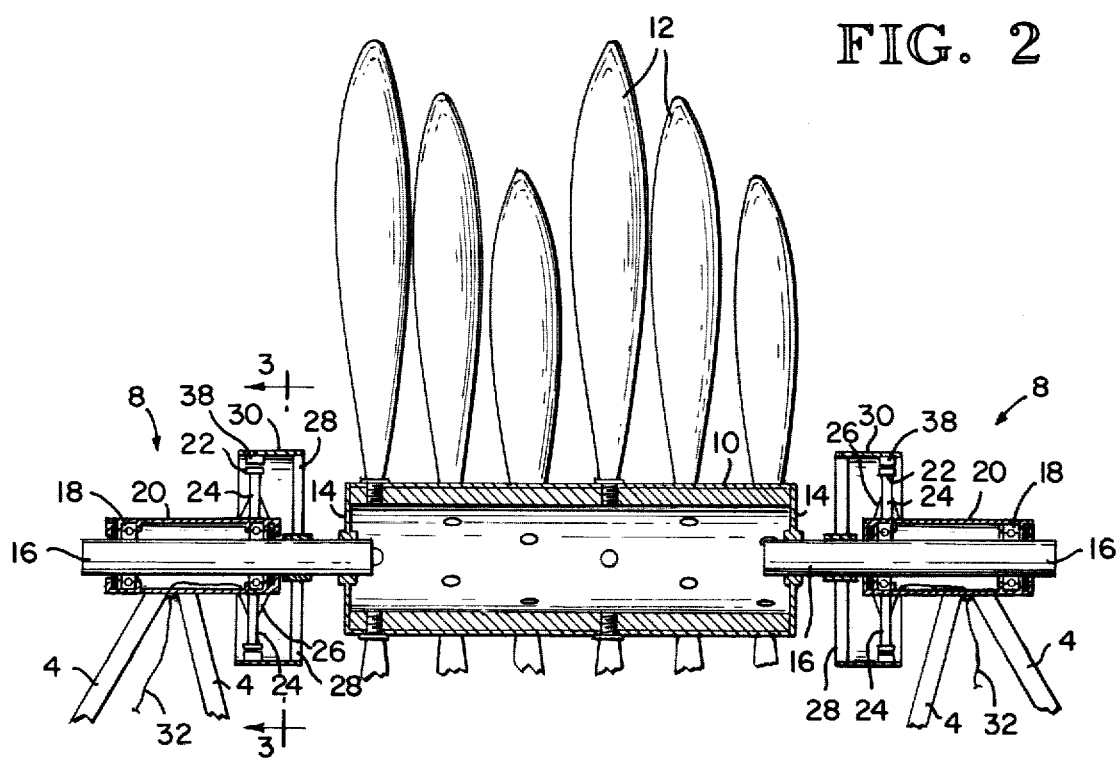
FIG. 2 is a cross-sectioned view taken through the generator of FIG. 1 showing the placement of the blades as well as the internal configuration of the generator itself.

Referring now to FIG. 2, it can be seen that the blades 12 are secured to the shaft or axle 10 by means of a threaded connection. It is to be understood that the particular method of connecting the blades is not a part of this invention and any one of a number of alternative methods could be used. The particular number of blades, their configuration, pitch and placement will be determined by the prevailing water conditions. The cylindrical shaft or axle 10 which is hollow to minimize the cost of construction and to minimize the weight has a closing and sealing plate 14 at each end which is rigidly and sealingly secured by welding or the like to a shaft 16 which extends axially outwardly from the axle 10. The combination of shafts 16 along with axle 10 is held rotatably in a horizontal position by means of multiple bearings 18 capable of withstanding radial and axial forces mounted within housing 20 of the portion designated generally by the numeral 8 in FIG. 1. The housing 18 is held rigidly in position by means of legs 4 as described hereinabove. It is to be noted that the pair of opposed generator assemblies 8 and their axles 16 serve as the sole support for the bladed axle or shaft 10.

The stator 22 of the generator is mounted upon a plurality of radial legs or spokes 24 to allow relatively free flow of water therebetween. The inner ends of the spokes 24 are secured to the exterior portion of the casing 20 and include fillets 26 for strength. The rotor is rigidly secured to the shaft 16 by means of a plurality of spokes or legs 28 and is located exterior to the stator on an axially extending flange 30 having mounted therein a plurality of permanent magnets 38. Further to be seen in this view is the electrical lead 32 which will carry the impulses to a power station automatic switching device or the like on the shore as noted with respect to FIG. 1.

Figure 3:
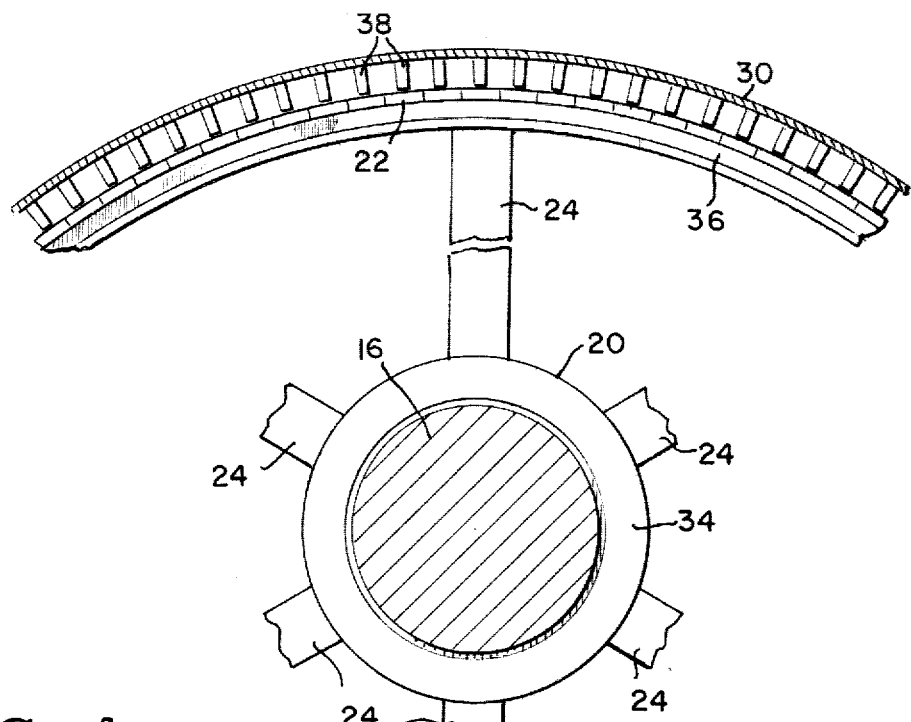
FIG. 3 is a partial sectional view taken along lines 3—3 of FIG. 2 shown on an enlarged scale to illustrate details.

Referring now to FIG. 3, which is a partial sectional view taken along lines 3—3 of FIG. 2, it can be seen that the central shaft 16 is surrounded by the end portion 34 of housing 20 which as noted above, contains the bearings 18, not seen in this view. Mounted to the exterior housing 20 are a plurality of spokes or arms 24 which extend radially outwardly to rigidly secure a support ring 36 upon which the coil for the stator 22 is mounted. Exterior of the stator 22 and mounted for rotation relative thereto is the rotor comprising the exterior housing 30 and a plurality of permanent magnets 38. As the magnets 38 pass over the coil 22, electricity is generated in a standard fashion. It is to be noted that in the particular invention the rotor and stator are located radially outwardly a substantial distance from the shaft thus increasing the relative velocity of the rotor and stator and increasing the output at any given rate of rotation of the shaft. The utilization of spokes or legs permits the greater distance without greatly effecting water flow.

Figure 4:
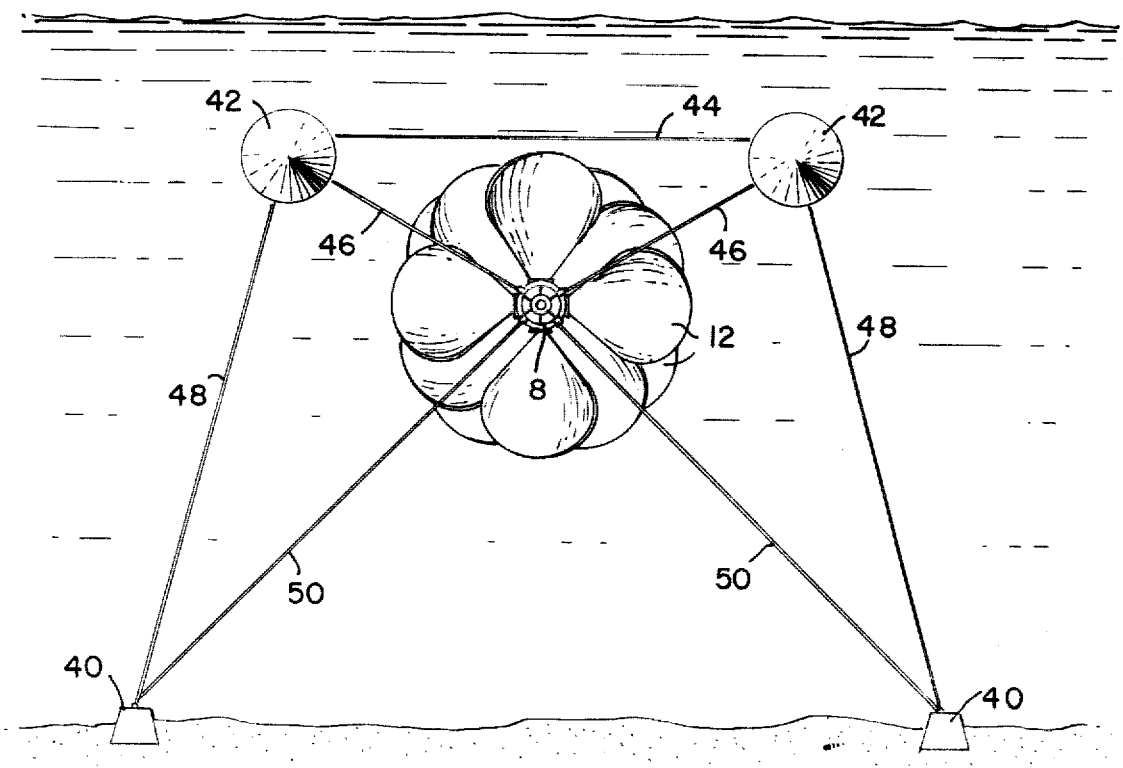
FIG. 4 is an elevational view showing a free floating generator held in a suspended state beneath the ocean surface but above the ocean floor.

Referring now to FIG. 4, one embodiment of the present invention includes the generating apparatus described in detail hereinabove but seen in this view primarily as blades 12 and a central core generating section 8 is free floating within an ocean stream. The generating system is secured in position by a plurality of anchors 40 secured to the bottom and a plurality of floats 42 which are of a hydrodynamic configuration. The floats interconnecting cables 44 to maintain the relative lateral position, cables 46 which extend downwardly to the generating station, cables 48 which extend down to the anchors 40 and cables 50 to extend from the anchors to the generating station. As can be seen in this view and in the following view, the placement of these cables assures relative stability of the electrical generating system, thus holding it in a position facing into the prevailing stream flow with little sway and minimal interferences with the flow itself.

Referring now to FIG. 5, the arrow indicates the direction of current flow and the hydrodynamic configuration of the floats 42 can be seen as well as the relationship between the floats 42 and the anchors 40, the various cables and the generating system as described hereinabove to assure stability of the generating device.

It is to be understood that each embodiment of the present invention contemplates the utilization of several turbo generators, either fixed to the same shaft or fixed to independent shafts if necessary to generate electricity at a usable rate. It is further to be understood that it is contemplated that lubricant will be provided to the bearings, at a pressure greater than the external water pressure to assure continuous lubrication and a monitor will be placed within each float to assure that there are no leaks. It is felt that these concepts are well known and thus not illustrated or described in detail.

Referring now to FIG. 6, it can be seen that the electrical generating station generally designated as E in this and the following 3 views is mounted within a flowing stream as which passes between the natural banks 52. A control and distribution station 54 is mounted adjacent the bank and the generator and the electricity generator is passed thereto by means of a conduit 56. To increase the fluid flow by the electrical generating mechanism E an underwater diversion barrier or reef 58 is constructed. It is to be noted that this barrier or reef effects only the flow of the stream substantially beneath the surface thus not in any way effecting the usability of the stream for other purposes. As will be described in greater detail later, it is recognized that the stream flow will vary and thus a multi-strand conduit is provided in conjunction with an automatic switching device to select interconnection with the various poles to assure stability in frequency.

As seen in FIG. 7, which is taken along lines 7—7 of FIG. 6, it is to be noted that the entire system including the barrier reef lies substantially beneath the surface of the stream S.

Referring now to FIG. 8, yet another method of increasing the fluid flow by the electricity generating station is shown. A diversionary structure 60 may be constructed approximately midstream to cause a partial diversion of the stream flow past the electrical generating station E. As seen in this view, the barrier 60 while extending above the surface of the stream and diverting some of the flow has little overall major affect upon the flow of the stream.

Referring now to FIG. 9, the relative positions of the barrier 60, stream S and the bank 62 which supports the control and distribution station 64 may easily be seen.

Figure 10:
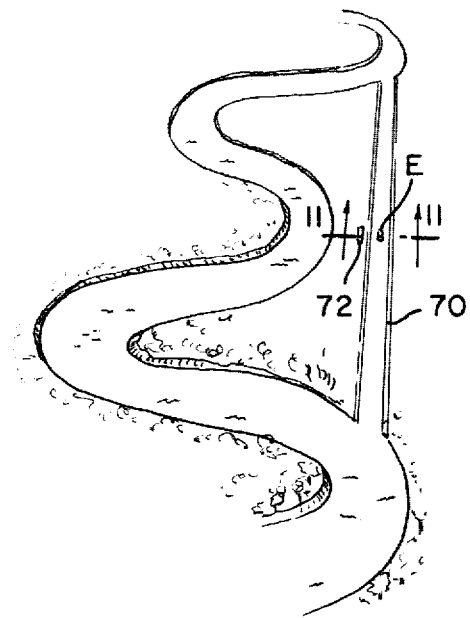
FIG. 10 is a schematic representation of yet another method of increasing current flow.

Referring now to FIG. 10, the capitalization upon the stream flow in a meandering river which is seen in this view may be accomplished by a diversionary straight-through channel 70 which takes part of the flow away from the main stream but not a sufficient amount to alter the stream itself. As seen in this view, the electrical generating element E mounted mid the channel and a distribution and control station 72 is mounted upon the bank.

Figure 11:
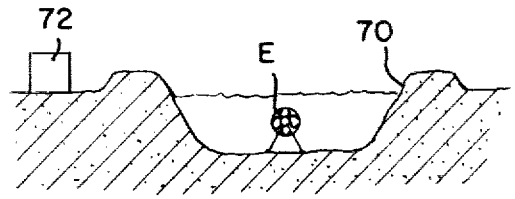
FIG. 11 is an elevational view taken along lines 11—11 of FIG. 10.

FIG. 11 depicts the channel 70 and the distribution house 72 of FIG. 10.

It is to be understood that the present invention contemplates the utilization of the natural stream flow in most conditions but where the rate of flow can be increased without greatly altering the natural flow in the main stream this is a desirable alternative.

Figure 12:
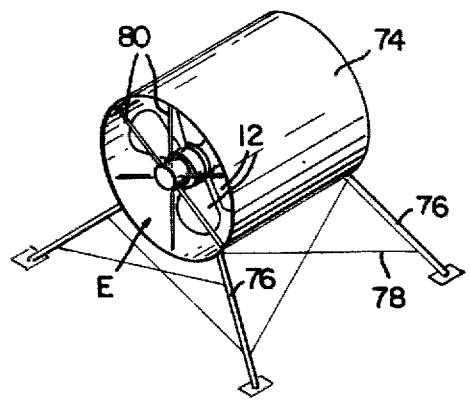
FIG. 12 is a view of an alternate embodiment of the inventive generator system.

Referring now to FIG. 12, which discloses an alternate embodiment of the present invention, it can be seen that a surrounding cylindrical member 74 is mounted upon a plurality of legs 76 strengthened by cables 78. Mounted interiorly of the cylinder 74 is the electrical generating element, again designated as E, which is supported by a plurality of spokes 80. The utilization of the surrounding cylinder capitalizes upon known hydrodynamic principals which prevents the fluid from as great an outward diversion following the contact with the blades 12. While this becomes a more efficient method of capitalizing upon the fluid flow itself, it must be remembered that the secondary principal of the present invention is to disturb the fluid flow as little as possible and therefore the utilization of this particular embodiment would require judicious application to prevent undue disturbance of the flowing streams.

Figure 13:
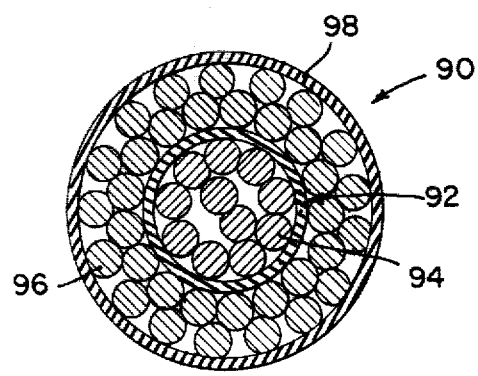

FIG. 13 depicts one means of transferring impulses from the generator to the control station. A coaxial cable 90 having an inner shielded section 92 is fabricated of individual insulated cables 94 which are continuously excited. The surrounding insulated cables 96, protected and insulated by covering 98, are selectively excited. As explained hereinabove, automatic switching means determines the poles which will be used to assure a stable frequency.

Figure 14:
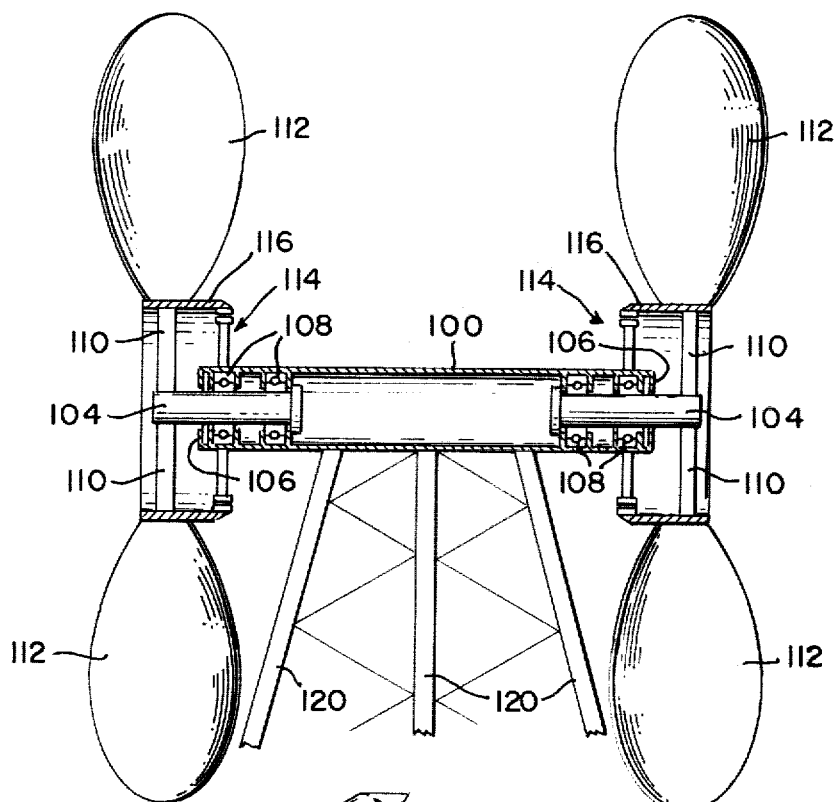
FIG. 14 is a cross-sectional view of another embodiment of the present invention.
Figure 15:
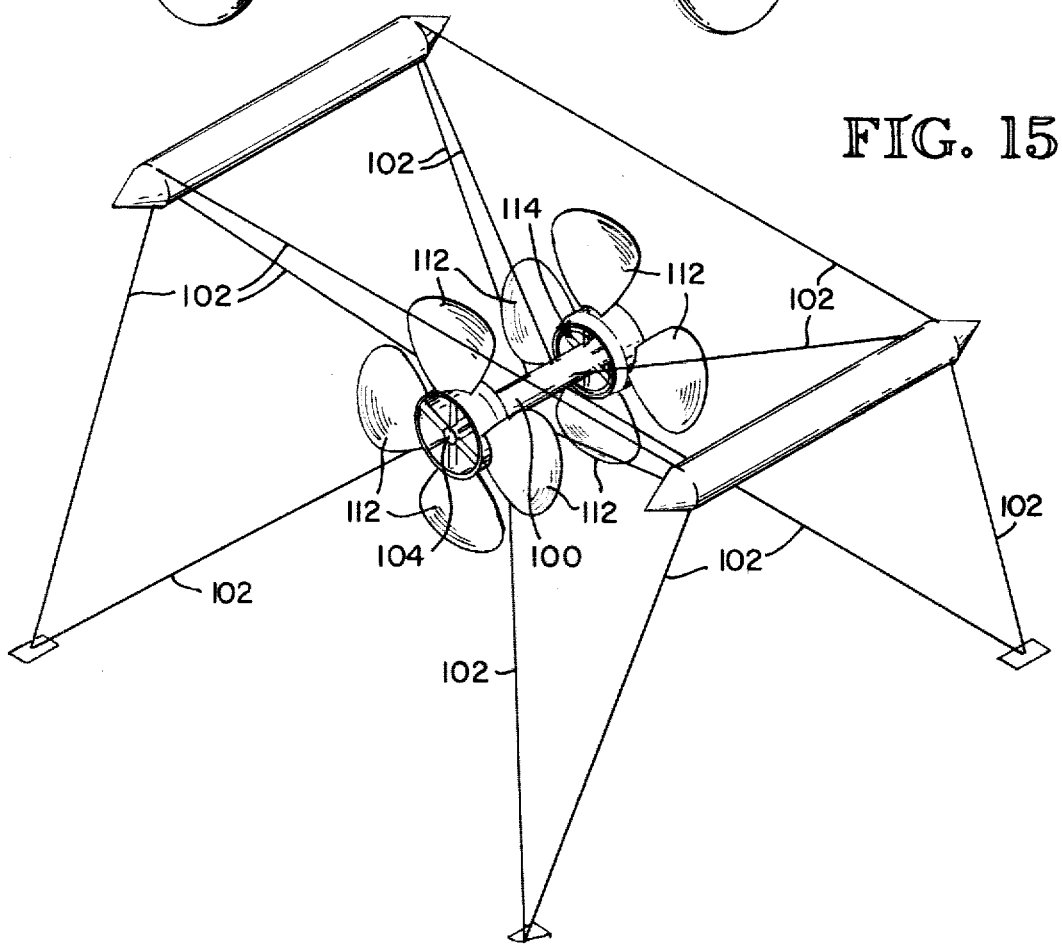
FIG. 15 is a cross-sectional view of still another embodiment of the present invention.

As seen in FIGS. 14 and 15, it is contemplated that the main support whether it be rigid (FIG. 15) or suspended (FIG. 14) be secured to a central rigid housing 100. In general, this configuration may be the most stable since, as seen and as described in detail hereinafter, the bending moment is confined to the weight and bending forces generated by the paddle wheels.

In FIG. 14, cables 102 extend upwardly to floats and downwardly to anchors similar to the configuration of FIGS. 4 and 5. A shaft 104 extends through end plate 106 of housing 100 and is rotationally secured by bearings 108. Radially outwardly extending spokes or arms 110 support blades or paddles 112. The stator, generally 114, is mounted to housing 100 and the rotor, generally 116 is secured to the paddles 112. This configuration permits the radial outward placement of the rotor and stator and yet has less forces which could cause misalignment.

FIG. 15 depicts an identical structure as FIG. 14 for convenience, with the exception of rigid support structure 120 identical identifying numeral as used.

Thus, as can be seen, the present invention effectively and efficiently capitalizes upon the fluid flow of a stream or upon the ocean current without causing a major disturbance of that flow. The configuration placement and shape of the blades upon the central rotating shaft in combination with the radial outward placement of the rotor and the stator in a fashion which allows fluid flow therethrough becomes highly efficient and nondamaging. The utilization of the inventive device described hereinabove allows capitalization of energy heretofore unavailable at relatively small cost in terms of construction and installation and at almost no cost in terms of environmental impact. It is contemplated that the capitalization of only 1% of the energy through the present longlived, minimum maintenance inexpensively constructed device will have a major impact upon the economy of the country using same.

It is contemplated that the disclosed device may equally well be used for DC current.

What is claimed is:

1. An underwater generator for use in a free flowing stream, comprising:

a substantially cylindrical hollow main housing member having exteriorly mounted thereon a plurality of radially outwardly extending blades, said blades mounted to the housing in a spiral pattern along the axis of the housing and having the major portion thereof at an angle to the flow of the stream such that water flowing by the housing within a cylindrical area defined by the outer edge of the blades will contact at least one of the blades, axially mounted shaft means extending from and secured to each end of the main housing means for turning therewith, radially outwardly extending spoke means secured to the shaft means for turning therewith having mounted thereon at the outer extreme a cylindrical ring including a plurality of radially inwardly facing permanent magnets, said magnets axially spaced from the spoke means, secondary fixed housing means including bearing means which rotatably support the shaft means and having a plurality of radially outwardly extending spokes supporting a coil adjacent the interior surface of the permanent magnets, means to support the secondary housing means, and means to transmit electricity generated to a distant point whereby electricity may be economically generated by a slow current.

* * * * *